Feb. 19, 1946. R. H. VARIAN ET AL Re. 22,724

RADIO TRANSMISSION AND RECEPTION

Original Filed April 14, 1938 2 Sheets-Sheet 1

INVENTORS.
RUSSELL H. VARIAN,
WILLIAM W. HANSEN.
BY Herbert H. Thompson
ATTORNEY.

Feb. 19, 1946. R. H. VARIAN ET AL Re. 22,724

RADIO TRANSMISSION AND RECEPTION

Original Filed April 14, 1938 2 Sheets-Sheet 2

INVENTORS,
RUSSELL H. VARIAN,
WILLIAM W. HANSEN.
BY
Herbert H. Thompson
ATTORNEY.

Reissued Feb. 19, 1946

Re. 22,724

UNITED STATES PATENT OFFICE 22,724

RADIO TRANSMISSION AND RECEPTION

Russell H. Varian, Wantagh, and William W. Hansen, Garden City, N. Y., assignors to Board of Trustees of the Leland Stanford Junior University, Stanford University, Calif.

Original No. 2,280,824, dated April 28, 1942, Serial No. 201,898, April 14, 1938. Application for reissue March 25, 1943, Serial No. 480,568

67 Claims. (Cl. 250—6)

This invention relates, generally, to radio transmission and reception, and has reference particularly to novel means and methods for the transmission and reception of modulated radio waves of high frequency. The invention is especially concerned with oscillators, amplifiers, detectors, modulators, and related apparatus adapted to oscillations of frequencies of $10^8$ cycles or more per second and it utilizes some of the elements described in Patent No. 2,190,712, issued February 20, 1940, in the name of William W. Hansen; Patent No. 2,242,275, issued May 20, 1941, in the name of Russell H. Varian; and our copending application Serial No. 185,382, filed Jan. 17, 1938, of which the present application is a continuation-in-part.

In Patent No. 2,190,712 a novel type of resonant circuit especially adapted to high frequency oscillation has been described. This general type of resonant circuit is utilized in the present invention and referred to herein.

In Patent No. 2,242,275 a novel type of velocity grouped electronic circuit adapted to high frequency oscillation, amplification, and detection has been described and is employed in the present invention.

The principal object of the present invention is to provide novel means and methods for radio transmission and reception, particularly for frequencies of $10^8$ or more cycles per second.

Another object of this invention is to provide novel means and methods for synchronizing one radio frequency oscillator with another remotely situated and for transmitting and detecting phase modulated signals.

Still another object of the present invention is to provide novel electrical and mechanical arrangements including the structures as a whole, means for accomplishing adjustments of the high frequency resonant circuits used therein, arrangements for observing the action of the elements of the mechanism and for their control, and means for the accomplishment of other desirable functions within the scope of the invention including frequency stabilization, phase modulation, phase detection, automatic volume control and stabilized regeneration, and other functional operations desirable in connection with the generation, amplification, modulation, transmission, reception and detection of high frequency oscillations.

Other objects and advantages will become apparent from the specification, taken in connection with the accompanying drawings wherein the invention is embodied in concrete form.

In the drawings.

Similar characters of reference are used in all of the above figures to indicate corresponding parts.

Figure 1:
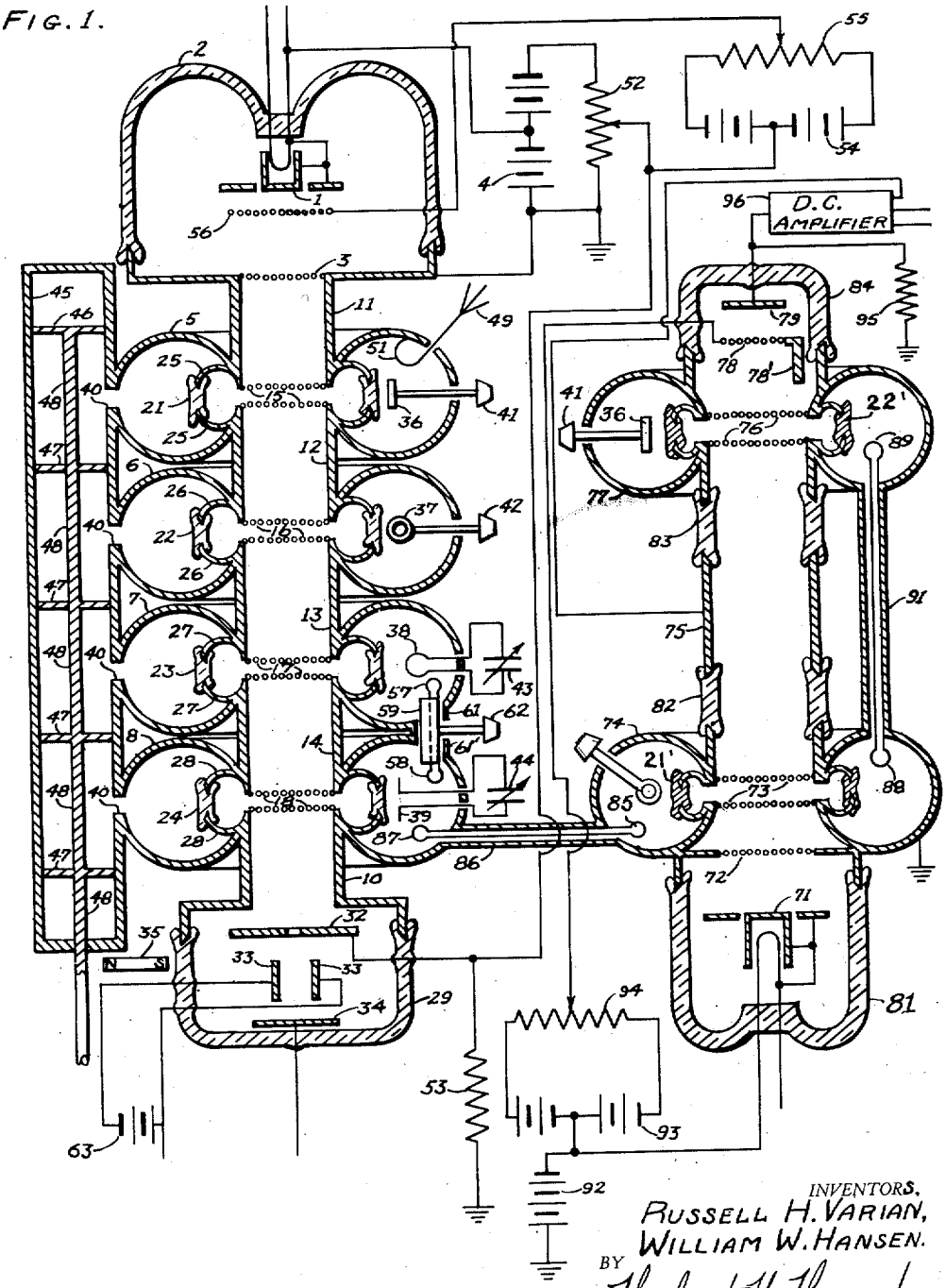
Fig. 1 is a general circuit diagram of a receiving circuit used in this invention.

Referring now to Fig. 1, there is disclosed an electron emitter 1, shown as an oxide-coated form, inside an evacuated insulating enclosure 2. The electrons emitted by emitter 1 are accelerated by a positively charged grid between which and the emitter 1 a battery 4 is connected. The electrons are projected as a beam through grid 3 and a plurality of the internally resonant hollow bodies or circuits 5, 6, 7, and 8 and all of which are individually adjustable as to frequency and are also spaced and supported by structural tubes 10, 11, 12, 13, and 14 which are aligned with one another. The internally resonant circuits have pairs of spaced grids 15, 16, 17 and 18. The four internally resonant devices 5 to 8 are all at ground potential, being connected through ground to the positive terminal of battery 4, and are open to the atmosphere and are also attached to the tubes 10 to 14 which in this case are made of conducting material. The space inside the tubes 10 to 14 containing the pairs of grids 15 to 18 is evacuated. To maintain the vacuum, annular enclosing insulating members 21, 22, 23, and 24 as of glass are employed inside the internally resonant devices and are sealed to the tubes 10 to 14 by annular seals 25, 26, 27, and 28. At the lower ends of these tubes 10 to 14 and opposite the emitter 1 there is provided a communicating enclosure 29 which in this instance is transparent although the same may be opaque. Inside enclosure 29 there is an apertured plate 32, a pair of spaced electrodes 33, and a fluorescent observing screen 34 which if desired may be provided directly on the end wall of transparent enclosure 29. Outside the enclosure 29 there is a magnet 35. Electrodes 33 are adapted for use in connection with plate 32 for deflecting the electron beam to accomplish its velocity analysis on the observing screen 34. Magnet 35 may be used jointly with or in lieu of the electrodes 33, if desired. They are not essential for operation.

Each of the devices 5 to 8 is provided with means for individually adjusting its frequency. The frequency of an internal resonant device can be adjusted mechanically by alteration of its shape or electrically by changing the form of its contained electromagnetic field. In Fig. 1, there are shown four ways of making electrical adjustments, any one or more of which may be used. In device 5 a dipole 36 is arranged in such a way that it can be rotated and translated in the device by handle 41, so it can occupy various parts of the field in various orientations. Its effect depends upon the distortion of the contained resonant field by the dipole field. Moving or rotating the dipole field changes the natural period of the enclosed field. Device 6 contains a closed loop 37 that can be rotated and translated in a way analogous to that indicated for the dipole 36. Elements 36 and 37 are operated by the handles 41 and 42, respectively, to vary the frequency. In device 7 there is a loop 38 which, instead of being closed like loop 37, is open and connected to a variable external condenser 43. Changing the capacitance of condenser 43 changes the effect of loop 38 and thus the frequency of device 7 is changed. A dipole 39 connected to a variable external condenser 44 is used in device 8 for the adjustment of frequency. Adjustment with the dipole and condenser is analogous to that with the loop and condenser.

The four devices 5 to 8 inclusive can be tuned simultaneously, if desired, by providing them with similar tuning adjustments and ganging the adjustments together in various convenient ways. One method of gang-tuning is shown at the left of the devices 5 to 8. A conducting tube 45 is attached to the devices as shown through passages 40, one such passage extending between the tube 45 and each device. In tube 45, there is a movable piston like element 46 that can be moved longitudinally in the tube. Element 46 has mutually spaced vanes or closures 47 that fit inside tube 45 and are carried by the rod 48. The whole element can be moved longitudinally by force applied to the rod 48. The distances between successive vanes 47 are of the dimension required for accommodating standing waves within the tube 45 and between successive vanes 47 at the frequency of the devices 5 to 8. Sliding the vanes longitudinally in the tube 45 moves the standing waves along the spaces containing the holes 40 communicating with the devices 5 to 8. The result is that the coupling of energy between the devices and the adjacent spaces between the vanes 47 varies; and these changes in coupling produce changes in the natural frequency of all the coupled circuits. Consequently moving the rod 48 tunes all the connected devices simultaneously.

The assemblage of the four devices 5 to 8 with the appurtenances connected to them constitutes a three stage radio frequency amplifier. Energy is received by the antenna 49 and coupled into the device 5 by the loop 51. This energy excites the grids 15 and the electron beam passing through the grids from the emitter 1 is slightly "bunched" in the way described in Patent No. 2,242,275. The slightly "bunched" beam excites device 6 and its grids 16 more strongly than device 5 was excited by the incoming signal on antenna 49, and the electron beam is bunched to a greater extent by grids 16. The same process is repeated with successive increases in "bunching" effect by resonant devices 7 and 8. The "bunching" in these devices increases so much from one stage to another that the phase relation of the "bunching" components in the successive stages has no great importance. For example, the character of the beam as it emerges from grids 18 is practically that which it would have had if it had not been operated on at all by grids 15, 16, and 17, but had been "bunched" by a signal in device 8 of the intensity of the amplified signal.

On comparison of any two of these devices with a pair of those described in United States Letters Patent No. 2,272,165, where internally resonant devices are used to deflect a cathode-ray beam, it is apparent that both types of treatment of the beam can be classed together as changing the vector velocities of the cathode rays. Therefore, the cascade principle of amplification shown in Fig. 1 can be applied also to the deflection of the beams, as will be apparent to those skilled in the art.

The finally "bunched" beam emerging from the grids 18 enters a field extending between the lower of these grids 18 and plate 32. Plate 32 is biased by connection to a potentiometer 52 which is connected to battery 4 and to a battery 54 and a potentiometer 55. Plate 32 may be biased in either of two ways. One way is to make the plate 32 sufficiently negative so that most of the electrons in the beam approaching it will be so reduced in speed that substantially the only ones that will strike it will be those with greater than average velocity. When there is no signal impressed on the antenna 49 practically no electrons will strike the plate 32 inasmuch as there will be no "bunching" and all the electrons will have substantially average velocity. Then as the signal increases the electrons in the beam will be alternately changed in velocity, some thus considerably exceeding average velocity, and a greater number of electrons will strike plate 32; the stronger the incoming signal the greater the percentage of electrons striking plate 32. This is a sufficient condition for detection of signals.

The other way of biasing is to make the plate 32 sufficiently positive so that substantially all the beam electrons of average or more than average velocity will strike it. With no signal, and thus no bunching, practically all the electrons in the beam will strike plate 32, but with a signal some of them are so reduced in speed that they fail to reach the plate 32. The greater the signal the greater the extremes of velocity of electrons in the beam and the more there are that are decelerated to the speed at which they fail to reach plate 32. This is a second sufficient condition for detection.

The electrons that reach the apertured plate 32 are stopped by the plate except for the relatively small proportion that go through the central aperture provided in this plate. The electrons that impinge on plate 32 pass to ground through a resistor 53, across which the electron current produces a potential difference. Resistor 53 is connected to biasing battery 54 and potentiometer 55 is also connected to a grid 56 in front of the emitter 1. The effect of these connections is to negatively bias grid 56 by an amount which increases with an increasing signal corresponding to increasing current in resistor 53. The potentiometer 55 is adjusted to accomplish this consistently with the way plate 32 is biased. As the negative potential on grid 56 increases, the number of electrons projected into the beam from the emitter decreases and so, by making the proper adjustment, the arrangement operates as an automatic volume control, restricting the strength of the detected signal to some predetermined limit.

Regeneration is shown introduced between two of the devices 7 and 8, by interconnected coupling loops 57 and 58. These loops are connected preferably by a concentric line 59 which can be rotated about its axis thus rotating the coupling loops, in the supports 61 by a handle or equivalent means 62. If the degree of excitation in device 7 is to be partially controlled by the degree of coupling between the two resonant devices, then the loops 57 and 58 may be in the same plane; but if the degree of excitation is controlled by transformation ratio, as in all closely coupled transformers, then the excitation in the two devices will be partially dependent on the fractions of their fluxes threading the respective loops. In order to get a suitable range of ratios of these fractions, it is advantageous in this type of coupling to have the planes of the loops substantially at right angles to each other. The loops have either equal or different areas. These loops are adjusted so the feed-back of energy from device 8 to device 7 is just sufficient for regeneration. For stabilized regeneration, the volume control potentiometer 55 is adjusted to the condition that just prevents the feed-back from starting oscillation of the devices 7 and 8. If oscillation begins, the number of electrons impinging on plate 32 begins to change rapidly and the bias on grid 56 is made more negative. The result is that the system can be held on the verge of oscillation, i. e., at the point where oscillation begins. If desired, there may be feed-back between any two or more of the devices 5 to 8. While four of these devices are disclosed in the drawings a greater or lesser number of the same may be used. The regenerative amplifier herein disclosed is claimed in copending application Serial No. 423,930, filed December 22, 1941, which is a continuation-in-part of the present application.

Observation of the electron beam is made through use of the fluorescent screen 34 and the electrodes 33. Electrodes 33 are simply a pair of rods or plates between which the electrons that emerge from the hole in plate 32 can pass. Electrodes 33 are connected to the terminals of a battery 63. When there is no signal in the system, the electrons that come through plate 32 all have nearly the same velocity. As they pass through the field between electrodes 33 they are deflected all by the same amount, thereby producing a spot on screen 34. When a signal is being received, the electrons have varying velocities, and when the system is in free oscillation they have velocities varying over an even greater range. Thus, when the system is operating the electrons that pass between electrodes 33 are deflected by varying amounts depending on their velocities. When the system is operating the spot on screen 34 spreads out into a band across the screen, the length of the band increasing with increasing strength of excitation. By observation of the appearance of the indication on the screen the operator can tell what is happening in the apparatus. The electric field between the electrodes 33 can be replaced by the magnetic field of the magnet 35, if desired, without particular impairment of the effectiveness of the arrangement.

The preceding description covers a multi-stage radio frequency amplifier and detector with stabilized regeneration and automatic volume control. This assemblage comprising elements numbered from 1 to 63 inclusive is a complete and useful arrangement for reception, amplification, and detection of radio signals, particularly signals of a frequency of approximately $10^8$ cycles per second or more. We will now proceed to the description of additional instrumentalities which together with those already described provide a system that will synchronize itself automatically with an incoming signal. The structure at the right in Fig. 1, comprising an electron emitter 71 from which a beam of electrons is accelerated by a grid 72 whose potential is positive with respect to the emitter 71. The electron beam is projected through a pair of grids 73 of an internally resonant device 74, a conducting tube 75, a second pair of spaced grids 76 of a second internally resonant device 77, and a detector grid 78 having a flange 78′ extending at right angles thereto for deflecting electrons reflected from grid 78 to one side so as not to reenter resonator 77. From the grid 78 electrons pass to the detector plate 79.

These detector elements 78 and 79 are shown in a mechanical arrangement that is different from that arrangement 32 used in connection with devices 5 to 8 and is alternative to the same. In the present arrangement, the emitter 71 is contained in an insulating envelope 81 sealed to device 74. Device 74 is made air-tight by seal 21′ and sealed to the tube 75 which is insulated by annular seals 82 and 83. Tube 75 is sealed to device 77 which is sealed to an insulating compartment 84. The entire assemblage of containers 81 and 84, devices 74 and 77, and tube 75 is air-tight and is evacuated. A coupling arrangement into device 74 is provided by a loop 85 connected to a transmission line 86 excited by a coupling loop 87 in device 8. Feed-back from device 77 to device 74 is provided by coupling loops 88 and 89, and a transmission line 91. These coupling connections must of course in this arrangement not impair the air-tightness of the assemblage. The devices 74 and 77 are adjustable as to frequency in any of the ways described in this specification as may be desired by the designer.

The accelerating potential difference for the electron beam from emitter 71 is provided by a battery 92. The detector grid 78 is biased by a battery 93 and a potentiometer 94. The detector plate 79 is connected to a resistor 95 and to the input of a direct current amplifier 96. The tube 75 is connected to the direct current amplifier 96 so it receives a potential which is a function of the instantaneous phase relation between the incoming radio frequency signal at coupling loop 85 and oscillations generated between devices 74 and 77. In general in the detection of phase modulated waves the receiver follows the phase shifts in the transmitter but lags behind them. The transmitter shifts phase more rapidly than the receiver can follow and there is produced in the receiver a rectified signal proportional to the phase shift of the transmitter. In the receiver, detection is accomplished by rectifying the resultant of the signal received from the transmitter and a signal generated in the receiver oscillator-detector 74—77.

In the operation of the arrangement shown, a signal is received by the antenna 49, amplified by devices 5 to 8 and finally delivered to device 74 by coupling loop 85. The oscillation frequency of devices 74 and 77 is adjusted to approximately that of the in-coming signal. The in-coming signal excites device 74 which bunches the electron beam from emitter 71 at the frequency of the in-coming signal, superimposing a component bunching of its own oscillation frequency. The bunched beam excites device 77 which provides feed-back energy through coupling loop 89 in device 77 and loop 88 in device 74 to maintain the system in oscillation. The electron beam after emerging from device 77 encounters grid 78 which is biased for detection as described above for plate 32. Plate 79 receives the detected electron beam current and with resistor 95 impresses on amplifier 96 a detected potential depending on the instantaneous phase relation between the oscillations in devices 74 and 77 and the in-coming signal from coupling loop 85. Amplifier 96 delivers an undulating potential to the tube 75 through which the electron beam passes in going from device 74 to device 77. This potential either increases or decreases the frequency of the oscillator by a method explained below. If the in-coming and local frequencies are not synchronous the potential of the detector plate 79 will be subjected to sinusoidal variations. These sinusoidal variations are amplified by amplifier 96 and are impressed on tube 75 and thus change the frequency of the oscillator, including devices 74 and 77, the frequency of the oscillator being displaced first to one side and then to the other of its natural frequency. In other words, its natural frequency is displaced first toward the frequency of the in-coming signal and then away from it. If the displacement of oscillator frequency toward the in-coming frequency per unit of detector voltage is great enough so that the oscillator attains the in-coming frequency before it has been pushed to the limit in that direction, it will lock into step with a phase relation which gives the proper voltage, for at synchronism the phase ceases to change. If the control overshoots slightly, the phase will start shifting in the reverse direction, and the detector potential of tube 75 will change so as to restore the proper phase relation.

If the natural frequency of the oscillator is the same as that of the in-coming signal, no potential is required to shift the frequency, and the phase relation between the two signals will be such as to produce no detected signal, that is, 90 degrees apart. If a reliable phase relation between the in-coming and the locally generated oscillations is desired, the frequency effect of the detector voltage as impressed on the tube 75 should be large compared with that required to maintain synchronism.

It remains to be shown that a change in potential of tube 75 will in fact change the frequency of the oscillator comprising devices 74 and 77. Since 75 is a conducting tube, the potential of the space within the tube is substantially the potential of the tube itself, and any electrons passing through it will have a velocity approximately proportional to the square root of the difference between the potential of the tube 75 and the potential of the electron source 71, hence the time of flight of the electrons from device 74 to device 77 and their average speed may be changed by varying the potential of tube 75. A change of the flight time changes the time of arrival of the electron bunches at the spaced grids of device 77, in the receiving circuit, and hence shifts the phase of the current therein. Then the feedback through loops 88 and 89 exciting the device 74 will have its phase shifted with respect to the oscillations in that circuit with a resultant change in the frequency of the circuit following well known laws. The synchronizing means described herein may have any desired rapidity of response, and all changes of phase in the in-coming signal that are too rapid for the synchronizing mechanism to follow will result in a shift of phase between the oscillator devices 74 and 77 and the incoming signal from loop 85. This results in a change in voltage on electrode 79 as a function of the phase shift, which is phase detection.

It will be evident to those skilled in this and the related arts that the radio frequency amplifier-detector comprehended by elements 1 to 63 inclusive can be used as such separately from the heterodyning amplifier-oscillator-detector comprehended by elements 71 to 96 inclusive, which likewise can be used for its own purposes separately or with other apparatus adaptable to combination therewith. Also it is evident that the apparatus may be modified in many ways for use in specialized applications to the generation, amplification, modulation, detection, transmission and reception of radio waves modulated in amplitude or phase or both.

Figure 2:
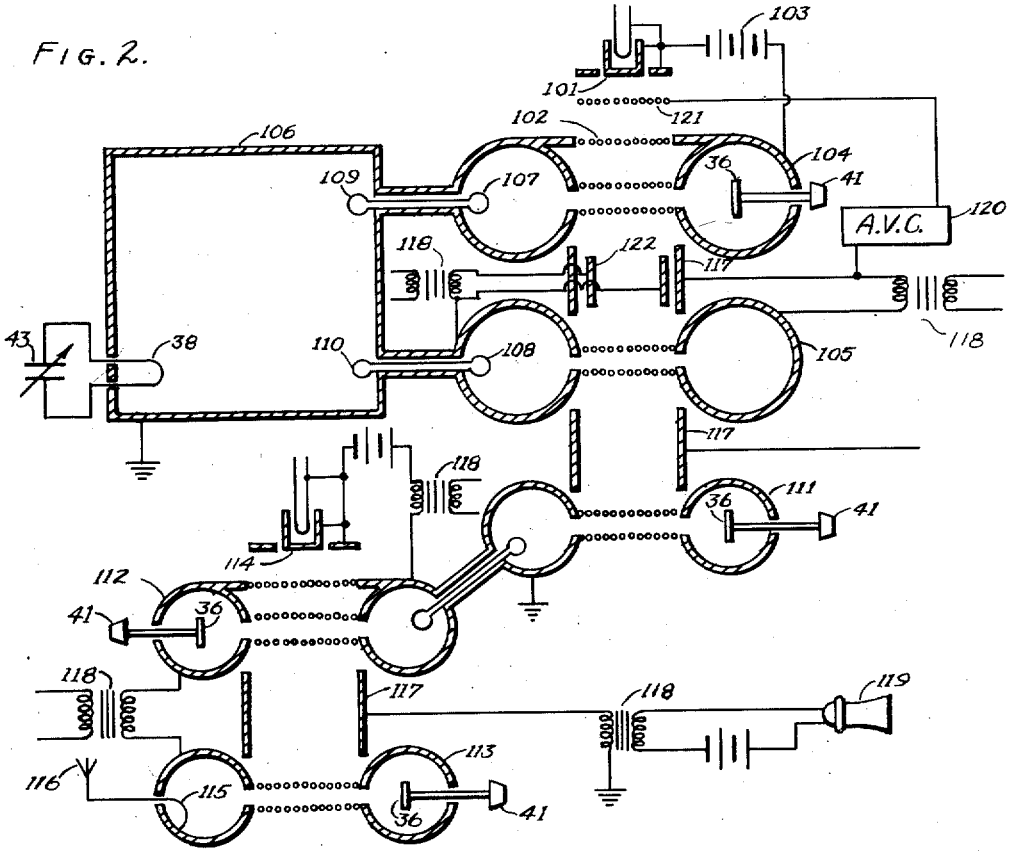
Fig. 2 is a circuit diagram of a transmitter used in this invention.

The transmission and reception of phase modulated waves is best accomplished with transmitters having high frequency stability. Fig. 2 shows such a transmitter. The subject matter of this figure is claimed in our divisional Patent No. 2,281,935. This figure includes an electron emitter 101, an accelerating and collimating positively charged grid 102, a battery 103, two hollow resonator devices 104 and 105, a coupling hollow resonator 106 and coupling loops 107 to 110. These elements operate as an oscillator largely as described in Patent No. 2,242,275, but instead of coupling directly from the second device 105 to device 104, as described before, they are coupled through a third hollow resonator device 106 preferably made considerably larger than 104 or 105 so that it will have a fundamental frequency much lower than the fundamental frequency of devices 104 and 105, and operating at one of its harmonic frequencies. As one of the consequences of the theory of hollow resonator operation set forth in Patent No. 2,190,712, it is well known that the ratio of the inductive reactance to the resistance of a resonant device is higher for the harmonics than for the fundamental frequency. Also, from the theory of radio circuits it is known that frequency stability is a function of this ratio which is commonly designated by the letter Q. Accordingly in this invention device 106 is operated on one of its harmonics for coupling between devices 104 and 105. A value of Q of the order of $10^4$ is not uncommon in these devices operating on the fundamental frequencies. It can be increased to $10^5$ or $10^6$ by using one of the higher harmonics. This, of course, increases the frequency stability of the system.

The theory developed for the velocity grouped electronic oscillator set forth in Patent No. 2,242,275 shows that the bunched beam contains many harmonics of the fundamental bunching frequency and that the beam can excite circuits oscillating at the harmonic frequencies as well as at the fundamental. This property is used as shown in Fig. 2 wherein the bunched electron beam after emerging from device 105 is used to excite another device 111 whose fundamental frequency is that of a Fourier harmonic of the frequency of the devices 105 and 104. Devices 104 and 105 act as a master oscillator and device 111 as a frequency multiplier. The output of device 111 is amplified in devices 112 and 113 which are provided with an electron beam emitter 114 and the usual battery and collimating grid. The amplified high frequency energy is shown as connected for delivery by a coupling loop 115 to an antenna 116 from which it is radiated.

Modulation of the signal can be accomplished in a number of ways as indicated in Fig. 2. One way is to use a tube 117 between any two of the resonant devices and to vary its potential using a transformer 118 and a telephone transmitter 119 or some other means of producing a modulating voltage. The tube 117 is illustrated in three different possible locations in Fig. 2. The effect of the modulating tube 117 is different in the several locations shown. In its location between devices 104 and 105 it shifts the phase of energy transfer between devices 104 and 105. In such a system where feed-back occurs, as it does in this instance, shifting the phase between two resonant components of the circuit changes the frequency somewhat, and it also changes the amplitude of the oscillations. In the arrangement shown, "pure frequency modulation" can be attained by having the voltage on tube 117 control also a volume control 120 connected to a modulating grid 121 which counteracts the amplitude modulating effect of tube 117. By this means tube 117 can modulate the frequency of the system without modulating its amplitude.

The effect of modulating tube 117 in the locations between devices 105 and 111 or between devices 112 and 113 is to phase modulate the output of the system. In phase modulation, the oscillator including devices 104, 105, and 106 oscillate steadily at their normal stable frequency, while the frequency multiplying device 111 and the amplifier devices 112 and 113 oscillate at the same frequency but with shifting phase between device 105 and the output device 113. The phase shifting effect between devices 105 and 111 is the same as between devices 104 and 105, but there is no feed-back from device 111 to change the system frequency. If device 111 is operating at a frequency that is the $n$th harmonic of the frequency of devices 104 and 105, the phase shift of the $n$th harmonic component of bunching in the electron beam in tube 117 is $n$ times the phase shift of the fundamental component. The effect of the tube 117 between devices 112 and 113 is the same as when it is between devices 105 and 111 as far as output is concerned. The entire effect is phase modulation.

Amplitude modulation of the system can be accomplished by the grid 121 as described in Serial No. 185,382. It can also be accomplished by spaced plates 122 in Fig. 2. Plates 122 deflect the electron beam passing between them so that the effectiveness of the beam is varied as a function of the beam deflection by the plates 122. The effectiveness of the beam is a maximum when it is centered in the system and it is reduced by deflection to either side. Accordingly the system is adjusted so that without modulation the beam rests at some intermediate position where the effect is less than maximum so that double frequency modulation is avoided. The same effect can be attained by blocking off a portion of the grids of device 105.

Plates 122 have in principle another possible use. If instead of exciting them at a modulating frequency they are excited at the oscillation frequency of the system the electron beam between the plates 122 can be shifted at the oscillating frequency. By adjusting the assemblage so that the electron beam is shifted considerably to one side reaching its maximum shift when the electron beam bunches at the grids of device 105 are in the phase least productive of system oscillation, and so that the beam is centered when the beam bunching at device 105 is at its optmium phase for production of oscillation, the bunching economy of the beam is improved. That is, the possible transfer of beam energy to the oscillating device 105 may be increased, by deflection, somewhat beyond the theoretical maximum percentage possible with bunching alone. For most effective operation the plates 122 would be replaced by a deflecting resonant device as shown in Serial No. 193,268, now Patent No. 2,272,165.

Amplitude modulation can be accomplished by the additional method of changing the voltage between the amplifier electron emitter 114 and device 112 as shown in Fig. 2. An additional method of accomplishing phase modulation is to change the voltage between amplifier devices 112 and 113.

In Fig. 2 the usual provisions for operation in vacuum and some other usual details have been omitted for convenience from the drawings.

The adjustment of the several internally resonant devices shown in Fig. 2 can be accomplished by any of the methods shown in Fig. 1. Usually all such devices but one in a system should be adjustable. In Fig. 2, the unadjusted device is shown as 105, but actually in practice it would usually be more convenient to make the adjustments on the resonant devices operating at their fundamental frequencies than on those operating at harmonics. Thus, in the system shown in Fig. 2, in practice, device 106 would preferably be the unadjusted one.

In the co-pending application Serial No. 185,382 transmitters are shown used with parabolic reflectors. Such a combination is generally applicable for transmitters of the frequencies of the order of $10^9$ cycles per second and higher. It is also in frequencies of this order that frequency stability may be very important.

As many changes could be made in the construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In apparatus of the character described for the control of radio oscillations, in combination, means for producing an electron beam, a plurality of resonant circuits comprising hollow internally resonant conducting members having standing fields therein, means providing a passage between said members that is free of the fields existing in the latter, said first named means acting to pass said beam through said hollow members via said passage for electrically interconnecting said circuits, and means for adjusting the frequency of said circuits.

2. Apparatus as in claim 1, wherein said frequency-adjusting means includes a conductive tuning member within one of said resonant circuits, and means for adjusting the position of said tuning member within said one circuit.

3. Apparatus as in claim 1, wherein said frequency-adjusting means comprises a flat conductive tuning member within one of said resonant circuits, and means for rotatably adjusting the position of said tuning member within said one circuit.

4. In apparatus of the kind described, a plurality of resonant circuits, means for coupling each of said resonant circuits to a system of standing waves of the frequency of the resonant circuits and means for varying the coupling of the standing waves to the resonant circuits by shifting the standing waves relative to the points of coupling with the resonant circuits.

5. Means for adjusting a resonant circuit having an electromagnetic field bounded by conducting surfaces, comprising, in combination with said resonant circuit, an external variable impedance, a coupling element in the field of the circuit, and means connecting said coupling element to said variable impedance positioned outside said field.

6. In ultra high frequency apparatus, the combination comprising conductive surface means defining an internally resonant hollow resonator adapted to contain an oscillating electromagnetic field, a second hollow resonator adapted to contain electromagnetic wave energy and having a wall section in common with said first resonator and communicating directly with said first resonator through an opening in said wall section, so that the resonant frequency of said first resonator may be varied by adjustment of said second resonator, and means in said apparatus providing such adjustment of said second resonator.

7. In ultra high frequency apparatus, conductive surface means defining an internally resonant hollow resonator adapted to contain an oscillating electromagnetic field, an external system of standing waves coupled to said field, and means for varying the coupling between said system and said field for controlling the resonant frequency of said resonator.

8. In ultra high frequency apparatus, conductive surface means defining an internally resonant hollow resonator adapted to contain an oscillating electromagnetic field, an external resonant circuit coupled to said field, and means for varying the coupling between said circuit and said field for controlling the resonant frequency of said resonator.

9. In ultra high frequency apparatus, conductive surface means defining an internally resonant hollow resonator adapted to contain an oscillating electromagnetic field, an external system of standing waves coupled to said field, and means for shifting said standing waves for varying the point of coupling between said standing waves and said field for controlling the resonant frequency of said resonator.

10. In ultra high frequency apparatus, two hollow resonators coupled by an electron beam, a tubular member having shiftable partitions dividing it internally into separated chambers, means defining communicating passages between said resonators and associated chambers for electrically coupling said resonators and chambers, and means connected for concomitantly adjusting said partitions for varying the electrical coupling between said chambers and resonators and thereby concomitantly gang tuning the resonators.

11. A control system comprising a velocity modulation tube having a resonant chamber, coupling means coupled to said resonant chamber, and means for varying the effective impedance of said coupling means comprising a variable condenser coupled to said coupling means, and means for varying the capacity of said condenser.

12. Frequency control apparatus for a hollow resonator comprising a conductive loop disposed within said resonator, and means for varying the impedance of said loop comprising a variable condenser mounted externally of said resonator and operatively connected to said loop.

13. In radio receivers, the combination of means for producing a beam of electrons, a plurality of internally resonant hollow conducting members excited directly by said beam of electrons and operating to amplify signals supplied to one of said resonant members, means for supplying a carrier signal to one member for amplification by said members, and means excited by the electron beam at the output of said resonant members for detecting said signal.

14. In a thermionic tube structure comprising a cavity resonator having an alternating electric field coacting with an electron stream, said field serving to effect recurrent changes in the kinetic energy of electrons of the stream, a detector comprising a transverse grid biased for segregating the electrons of the stream in accordance with their respective kinetic energies obtaining as they reach said grid; an electron collecting electrode for collecting one group of electrons segregated by said grid, said grid having a flange for deflecting the remaining group of electrons to one side so as not to reenter said resonator, a load circuit and means connecting said collecting electrode to said load circuit for passing the first group of segregated electrons therethrough.

15. In a thermionic tube structure comprising electron grouping and energy absorbing cavity resonators, means for passing an electron stream through said electron grouping and energy absorbing resonators, said electron grouping resonators serving to recurrently vary the kinetic energy to the electrons of the stream, a detector comprising a grid positioned to segregate electrons leaving said energy absorbing resonators in accordance with their kinetic energy obtaining as they reach said grid, an electron collector positioned for collecting electrons passing through said grid, and load means in series with said collector.

16. In a radio receiver, means for producing a beam of electrons, internally resonant hollow conductive resonator means having an electron permeable region through which said beam is passed, means supplying an input signal to said resonator means to modulate said beam, and means at the output of said resonator means in the path of said modulated beam for detecting said signal.

17. In a radio receiver, means for producing a beam of electrons, internally resonant hollow conductive resonator means having an electron permeable region through which the beam is passed, means supplying an input signal to said resonator to act on said beam, and means at the output of said resonator means in the path of said modified beam for detecting said signal.

18. In a radio receiver, means for producing a beam of electrons, a plurality of internally resonant hollow conducting members having electron permeable regions through which said beam is successively passed, means supplying an input signal to the first of said members to modulate said beam, and means at the output of said resonant members in the path of said modulated beam for detecting said signal.

19. In a radio receiver, means for producing a beam of electrons, internally resonant hollow conductive resonator means having an electron permeable region through which said beam is passed, means for supplying an input signal to said resonator means to modulate said beam, and an apertured member at the output of said resonator means in the path of said modulated beam for detecting said signal.

20. The receiver defined in claim 19, wherein an angular flange arranged and biased for laterally deflecting electrons is provided on said apertured member.

21. In a thermionic tube structure comprising a cavity resonator having an alternating electric field, means for passing an electron stream through said field, said field serving to effect recurrent changes in the kinetic energy of electrons of the stream, a detector comprising a grid biased for segregating the electrons of said stream in accordance with their respective kinetic energies as they reach said grid, and means adjacent said grid for laterally deflecting electrons reflected by said grid for preventing said reflected electrons from reentering said resonator.

22. In a thermionic tube structure, means producing an electron stream, hollow resonator means in the path of said stream and coupled in electron grouping and energy absorbing relation with said electron stream, a grid positioned in the path of the grouped electron stream beyond said hollow resonator means and biased to segregate electrons leaving said resonator means, and an electron collector positioned for collecting electrons passing through said grid.

23. Apparatus for automatically controlling amplification in an electron beam amplifier comprising means for producing a beam of electrons, means for causing periodic changes to take place in the vector velocity of electrons in the beam, a plurality of substantially enclosed resonant circuits, said changes in vector electron velocity serving to excite electromagnetic resonance in said plurality of circuits, said circuits reacting on the electron beam to produce greater changes of vector velocity, and means for segregating the electrons of the beam according to their velocity and using the current so obtained to control the intensity of said electromagnetic resonance in said plurality of resonant circuits.

24. Apparatus for converting a received ultra-high frequency signal of variable intensity into an amplified signal of substantially constant average intensity comprising means for producing an exciting electron stream, a velocity grouped electron stream amplifier having electron stream grouping means, means for controlling the current of the electron stream before it enters said electron grouping means, said electron stream grouping means acting to velocity group the electrons of said stream, means for impressing a received signal on said velocity grouping means, means for absorbing high frequency energy from said velocity grouped electron stream, means for segregating said electron stream into two portions according to electron velocity after passage through said energy absorbing means, and means for utilizing one of said stream portions to excite said electron current controlling means.

25. A stabilized regenerative amplifier comprising means producing an exciting electron stream, means for regulating the current in said exciting electron stream, input and output circuits excited by said stream, feed-back means coupling said input and said output circuits, means responsive to amplitude of oscillation in said output circuit, and coupling means extending between said amplitude responsive means and said electron stream current regulating means so connected that an increase in excitation of said output circuit results in a decrease in electron stream current.

26. In electron discharge apparatus, means providing an electron beam, means controlled by a received high frequency signal for producing electron grouping along said beam, and means responsive to said grouped beam for automatically controlling the intensity of said beam.

27. High frequency apparatus comprising means for producing an electron stream, means controlled by a high frequency signal for producing electron grouping along said stream, and means responsive to said grouped stream for automatically controlling the average speed of the electrons of said stream.

28. In electron discharge apparatus, means providing an electron beam, means controlling the intensity of said beam, velocity modulation means controlled by a received high frequency signal for producing electron grouping along said beam, means for segregating said electron beam into portions according to their velocity, and means utilizing one of said portions to control said beam intensity control means.

29. In electron discharge apparatus, means providing an electron beam, means controlled by a high frequency signal for producing electron grouping along said beam, a resonant output circuit comprising an oscillating electromagnetic field coupled to said beam, and means responsive to said grouped beam for controlling the amplitude of oscillations in said output circuit.

30. In an electron discharge device, a pair of hollow conductive internally resonant members, means for projecting an interacting electron beam through said members, a control electrode located to act on said beam prior to projection through said members, and means beyond said members excited by said beam and connected to control said electrode.

31. In electron discharge apparatus, successive input and output resonant circuits coupled by an electron beam, feed-back means between said circuits for delivering energy from said output circuit to said input circuit, means for controlling said beam, and means in the path of said beam beyond said output circuit for extracting energy from said beam and controlling said beam control means by said energy.

32. High frequency apparatus comprising input and output resonant circuits coupled by an electron beam, means for controlling said beam, and means in the path of said beam beyond said output circuit for extracting energy from said beam, and means for controlling said beam-controlling means by said extracted energy.

33. Apparatus for causing a high frequency beam type oscillator to operate in fixed frequency relation to a source of high frequency electromagnetic energy comprising an oscillator, means for supplying energy from said source to said oscillator, said oscillator consisting of spaced electron grouping and energy absorbing means, means providing back coupling therebetween, means for projecting an electron beam through said electron grouping and said energy absorbing means, detector means responsive to the amplitude of oscillation of said energy absorbing means, means for controlling the flight time of the electrons between said electron grouping and said energy absorbing means, and means controlled by said detector means for energizing said flight time controlling means to thereby maintain a fixed frequency relationship between said oscillator and said source of high frequency electromagnetic energy.

34. In a thermionic tube structure comprising resonant circuits having alternating electric fields coacting with an electron stream, a detector comprising a grid biased for segregating the electrons of the stream in accordance with their respective energies, an electron collecting electrode for collecting one group of electrons segregated by said grid and electrode means energized from said detector for controlling the frequency of oscillation of said resonant circuits.

35. In electronic discharge apparatus, a source of ultra high frequency energy, an oscillator having an electron beam passing therethrough so as to produce electron velocity modulation of said beam, means for supplying ultra high frequency energy from said source to said oscillator, and means responsive to the velocity modulated beam emerging from said oscillator for regulating the frequency of oscillation of said oscillator to maintain it in fixed frequency relation with said source.

36. In electronic discharge apparatus, a source of ultra high frequency energy, an oscillator comprising hollow resonator means adapted to contain an oscillating electromagnetic field, means for supplying said resonator means with high frequency energy from said source, means for passing an electron beam through said resonator means in velocity changing and energy interchanging relation with said field, and means responsive to the beam emerging from said resonator means for regulating the frequency of oscillation of said oscillator to maintain it in fixed frequency relation with said source.

37. In a tube structure, a plurality of mutually spaced resonant circuits arranged to have alternating electric fields, means for passing a stream of electrons through said alternating fields, a source of high frequency energy, means for supplying energy from said source to one of said circuits, and potential applying means distinct from said stream passing means and operating on the electron stream for controlling the flight time of electrons of the stream between the alternating electric fields of said circuits for automatically maintaining the frequency of oscillation of said circuits in fixed frequency relation with said source.

38. High frequency apparatus comprising a resonant circuit having an alternating electric field coacting with an electron beam, a detector comprising a grid biased for segregating the electrons of said beam in accordance with their respective energies, an electron collecting electrode for collecting one group of electrons segregated by said grid, and electrode means energized from said detector for controlling the frequency of oscillation of said circuit.

39. High frequency apparatus comprising a resonant circuit having an alternating electric field coacting with an electron stream, means for segregating the electrons of said stream in accordance with their respective energies, and means responsive to one group of said segregated electrons for controlling the frequency of oscillation of said circuit.

40. Means for control of regeneration in amplifiers, comprising a pair of substantially closed hollow conducting internally resonant circuits, a pair of elements capable of radiating electromagnetic waves connected by suitable conductors and placed respectively in the electromagnetic fields of the said circuits, and means for changing the position of said elements to change the regenerative impedance of the circuits.

41. In radio amplifiers, the combination of a plurality of enclosed resonant circuits excited directly by a beam of electrons, with a plurality of adjustable resonant circuits coupled to the excited circuits, the adjustable circuits being provided with parts simultaneously movable for changing the coupling between the associated circuits.

42. Means for control of electronic apparatus comprising a pair of individual resonant circuits providing a pair of electromagnetic fields and coupled by an electron beam, a pair of high frequency coupling elements interconnected by suitable high frequency energy-transferring means and located respectively in the electromagnetic fields of said circuits, and means for varying the positions of said elements with respect to said fields for controlling energy interchange between said circuits.

43. In an electronic discharge device, a pair of internally resonant hollow conductive bodies providing a pair of electromagnetic fields coupled by an electron beam, an energy coupling loop in each of said bodies, means for transferring high frequency energy between said loops, means for mounting said loops for simultaneous displacement for changing their coupling with the fields within the respective bodies, and means operable externally of said bodies for displacing said loops.

44. The device defined in claim 43, wherein said loops are substantially in the same plane for effecting similar frequency control of said fields.

45. The device defined in claim 43, wherein said loops are arranged angularly with respect to each other so that said displacement effects differential frequency control of said fields.

46. In a receiver, a plurality of substantially non-radiating connected resonant circuits having alternating electric fields, means for setting up an electron stream for passage through said fields, a feed-back means interconnecting at least two of said circuits to obtain regeneration, detector means excited by said electron stream, and means responsive to the operation of said detector means and operating on said electron stream for controlling the amount of said regeneration.

47. High frequency apparatus comprising means defining a plurality of alternating electric fields, means for projecting an electron stream successively through said fields, feed-back means coupling a pair of said fields for obtaining regeneration, and means responsive to said electron stream for controlling the amount of said regeneration.

48. High frequency apparatus comprising a pair of resonant circuits providing alternating electric fields, means for projecting an electron stream through said fields, feed-back means coupling said circuits to obtain regeneration, and means responsive to said electron stream for controlling the amount of said regeneration.

49. Electron discharge apparatus comprising an evacuated enclosing vessel having a tubular insulating portion, means opposite one end of said portion for producing an electron beam, a first electrode opposite the other end of said portion in the path of said electron beam, a pair of electrodes within said vessel between said means and said first electrode defining a gap to be traversed by said electron beam, and hollow resonator means outside said vessel and conductively connected to said pair of electrodes.

50. High frequency apparatus comprising an evacuated enclosing vessel, means for producing an electron beam within said vessel, a first electrode within said vessel in the path of said electron beam, a pair of beam-controlling electrodes within said vessel between said beam-producing means and said first electrode and defining a gap to be traversed by said beam, and hollow resonator means surrounding said vessel and coupled to said pair of electrodes to provide interaction between the field of said resonator and said beam.

51. High frequency apparatus comprising means for producing an electron stream, an electrode spaced from said first-named means in the path of said stream, an evacuated enclosing vessel surrounding said stream-producing means and said electrode and having an insulating portion therebetween, and a cavity resonator having a pair of adjoining walls defining a narrow gap therebetween, said resonator surrounding said evacuated vessel and having said gap opposite said insulating portion, whereby the field within said resonator may interact with the electron stream within said vessel.

52. The method of determining the presence of and of measuring electrical oscillations in an electron beam amplifier having a resonant circuit adapted to set up an oscillating electric field, comprising projecting the beam of electrons through the oscillating field of the amplifier, segregating the electrons according to velocity, and projecting the segregated electrons against a fluorescent screen the length of the luminous path so formed on the screen providing an indication of the strength of the oscillating electric field.

53. In electronic apparatus, the combination comprising means for producing a constant velocity stream of electrons, means for periodically varying the constant speed of said electrons along their direction of motion in accordance with a high frequency signal, means providing a fixed electron deflecting field along the path of said velocity-varied electrons, whereby said electrons are segregated in accordance with their velocities, and a fluorescent screen in the path of said stream beyond said deflecting means.

54. In electronic apparatus, means for producing a constant velocity electron beam, means for periodically varying the speed of the electrons of said beam in the direction of motion of said electrons, means in the path of said beam for segregating electrons according to velocity, and a fluorescent screen in the path of certain of said segregated electrons.

55. In electronic apparatus wherein an electron beam is passed through an interacting high frequency electromagnetic field, an apertured conductive member in the path of said beam beyond said field, means for applying a potential to said member to collect a portion of said beam, and a fluorescent screen in the path of the remainder of said beam passing through said aperture.

56. In electronic apparatus, means defining a hollow resonator of conductive material, means for projecting a beam of electrons through said resonator, an aperture plate in the path of said beam, a fluorescent screen in the path of a portion of said beam, and a transparent window in said apparatus for observation of said screen.

57. Apparatus for measuring a high frequency voltage, comprising means for producing a stream of electrons, means responsive to said voltage for velocity-modulating the electrons of said stream, means for deflecting said velocity-modulated stream by a constant transverse deflecting field, and a fluorescent screen in the path of said deflected stream whereby the linear spread of the indication on said screen is a measure of said voltage.

58. Electron discharge apparatus for measuring high frequency conditions comprising an electron gun generating a beam of electrons, resonant means in the path of said beam and apertured to permit passage of said beam of electrons through said resonant means, whereby the electrons in said beam may be velocity modulated in accordance with the resonant condition of said resonant means, deflecting means setting up a constant deflection field in the path of said beam, said deflecting means being disposed after said resonant means, and a fluorescent screen disposed in intercepting relationship with respect to the electrons of said beam after passing said deflecting means.

59. A method of cascade amplification of a high frequency signal through use of a plurality of resonant circuits which consists of passing an electron beam through an initial resonant circuit to effect velocity grouping in the electron beam, passing said thusly grouped beam through another resonant circuit to deliver energy to such resonant circuit which in turn further enhances the velocity grouping, and repeating the process by passing the partially grouped beam through an additional resonant circuit effecting further grouping until the desired amplification is obtained.

60. A high frequency amplifier comprising means employing an electron stream for amplifying radio signals, said means including a plurality of substantially enclosed resonant circuits arranged in succession, means for producing and projecting an electron stream through said circuits in succession, means for exciting the first of said circuits with a radio signal whereby an oscillating field is set up in such circuit causing the electron stream passing therethrough to become velocity grouped, the velocity grouped stream entering the second of said circuits and acting to establish oscillations therein that are stronger than those existing in the initial resonant circuit, thereby effecting further velocity grouping of the stream, the stream thereafter entering still another of said circuits and acting to establish a further amplified oscillation therein thereby effecting amplification of the signal.

61. The method of amplifying a high frequency signal which consists of generating a stream of electrons, passing said stream through a region wherein it is subjected to an alternating electric field to produce variable electron velocities in said stream, passing said stream through a second region to allow said variable velocities to effect recurrent partial grouping of the electrons of said electron stream, passing said partially grouped stream into a third region containing an alternating electric field to cause said stream to deliver energy to said field and to effect greater variable electron velocities in said stream, passing said stream through a fourth region to allow said greater variable velocities to group said electron stream more strongly, and passing said stream into a fifth region containing an alternating electric field to deliver energy to said last named field.

62. Ultra high frequency cascade amplifier apparatus comprising means producing a beam of electrons, means producing a high frequency field acting on said beam to effect at least partial grouping of the electrons along said beam, means providing a second high frequency field excited by said electron beam and disposed beyond said first field for interacting with said partially grouped beam to effect additional grouping of electrons in said beam, and means utilizing said additionally grouped beam for producing high frequency oscillations.

63. Ultra high frequency cascade amplifier apparatus comprising means producing a beam of electrons, means defining a hollow resonator adapted to contain an oscillating electromagnetic field through which said beam is passed in such manner as to effect velocity modulation of the electrons in said beam, a drift space through which the beam passes beyond said body and wherein said electrons become grouped along the beam, a second hollow resonator adapted to be excited by said grouped beam to produce an oscillating electromagnetic field effecting additional velocity modulation of said beam, and means utilizing said additionally modulated beam for producing high frequency oscillations.

64. Ultra high frequency apparatus comprising means for producing an electron beam wherein electrons are disposed in groups along the beam, and means defining an internally resonant hollow resonator through which said grouped beam is passed in such relation that said resonator is excited by said beam to produce an oscillating electromagnetic field in said resonator, and said field is so phased with said grouped beam as to effect electron velocity modulation of said beam for enhancing said original grouping.

65. High frequency apparatus comprising means for producing an electron stream, means for effecting recurrent partial bunching of the electrons of said stream, and resonant circuit means excited by said partially bunched stream for receiving said partially bunched stream and for effecting further bunching of the electrons of the stream.

66. A high frequency tube structure comprising means for producing an electron stream, means for setting up an alternating electromagnetic field for initiating recurrent partial bunching of the electrons of the stream, and hollow resonator means for receiving said partially bunched stream and for effecting further bunching of the electrons of the stream and the subsequent removal of energy from the bunched stream.

67. A high frequency tube structure comprising means for producing an electron stream, resonant circuit means for effecting recurrent changes in velocity of the electrons of the stream resulting in the consolidation of many of the electrons of the stream into successive bunches, and additional resonant circuit means positioned for acting upon said thusly bunched stream to effect initial consolidation of additional electrons of said stream with said bunches and thereafter the absorption of energy from said more completely bunched stream.

RUSSELL H. VARIAN.
WILLIAM W. HANSEN.